May 17, 1938.  J. F. GEORGE  2,117,799
MILKING PAIL
Filed Dec. 18, 1936  2 Sheets-Sheet 1
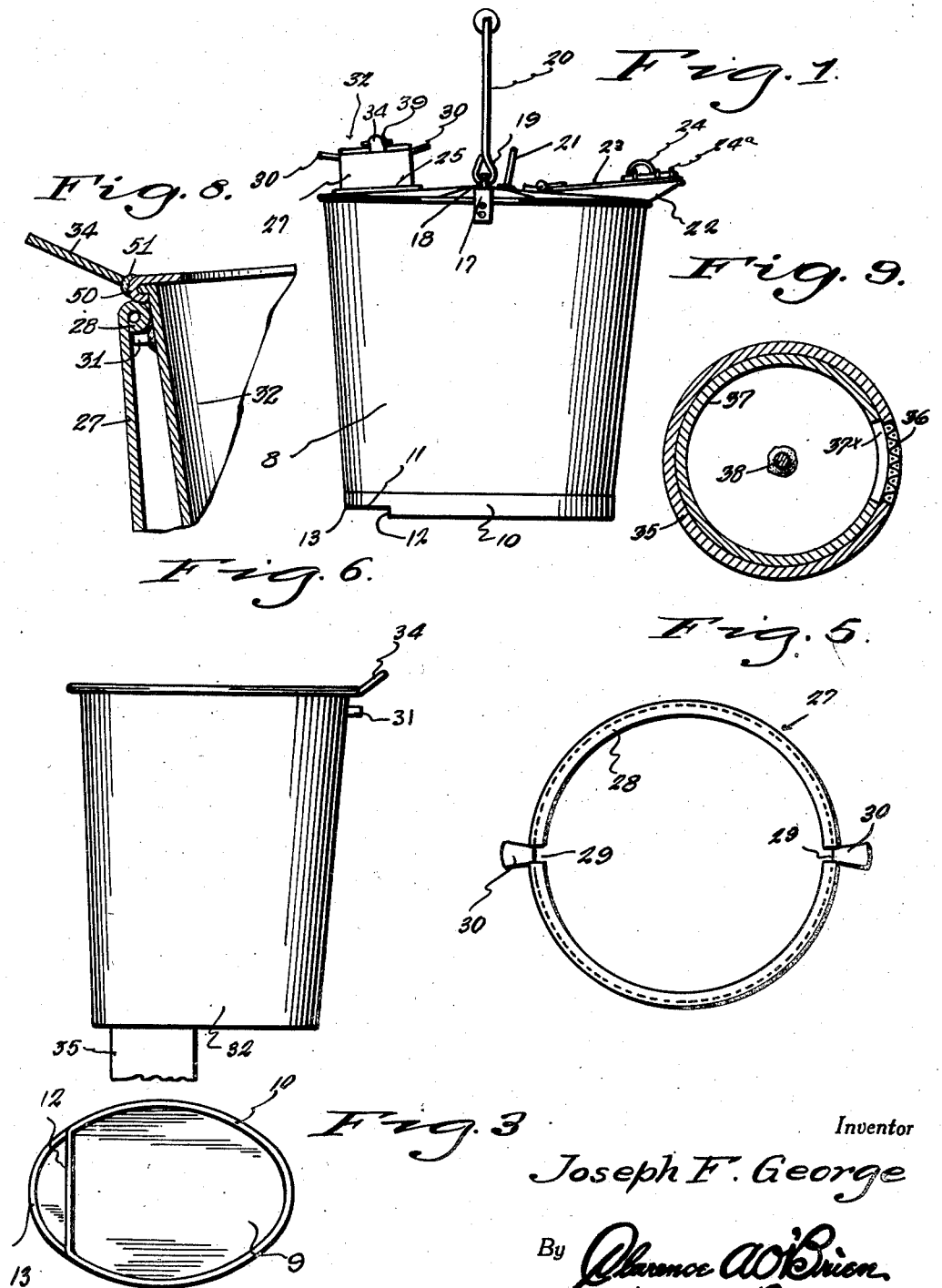
Inventor
Joseph F. George
By Clarence A. O'Brien
Hyman Berman
Attorneys May 17, 1938.  J. F. GEORGE  2,117,799
MILKING PAIL
Filed Dec. 18, 1936   2 Sheets-Sheet 2
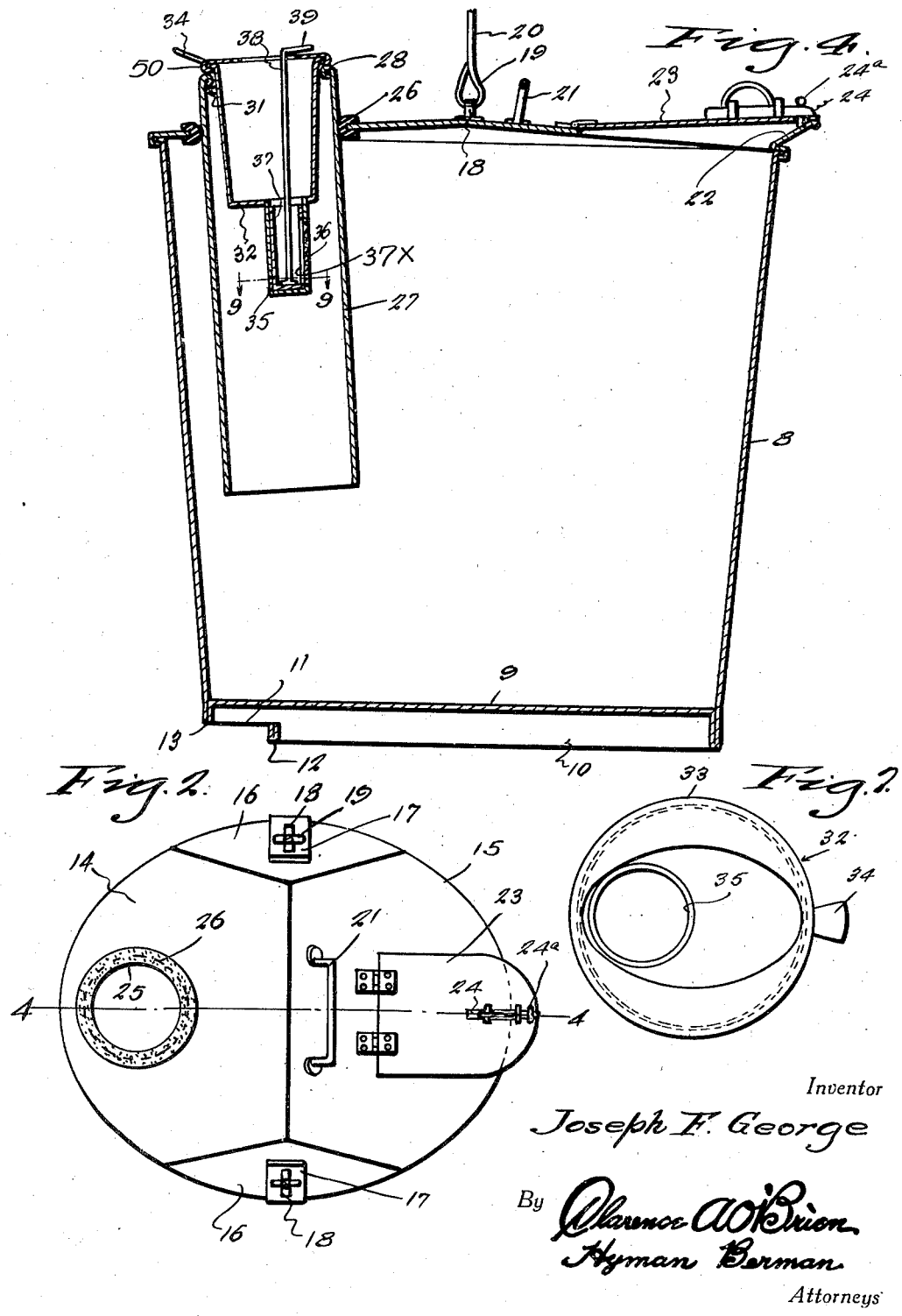
Inventor
Joseph F. George
By Clarence A. O'Brien
Hyman Berman
Attorneys Patented May 17, 1938

2,117,799

UNITED STATES PATENT OFFICE 2,117,799

MILKING PAIL

Joseph F. George, Gustine, Calif.

Application December 18, 1936, Serial No. 116,632

3 Claims. (Cl. 31—52)

This invention relates to a novel and improved milking pail for dairy use and in reducing to practice the various ideas of the conception I have perfected a structure characterized by a number of advantageous features.

One seemingly new feature is a novel and improved bottom for the pail or bucket, the bucket itself being somewhat oval-shaped in bottom plan view and having novel tilting means at one end such as to permit the bucket to be tipped to the desired angle and held substantially firm against the ground or other support, whereby to overcome undesirable rocking and rolling axially, such as would be present if a circular bottom bucket were utilized.

A predominating feature in the arrangement is the permanently attached cover wherein the same is provided at one end with a hinged lid equipped spout to facilitate pouring or emptying the contents into a storing or transporting can or other receptacle, said cover being provided with a suitably located hand grip to facilitate gripping or tilting the pail in the aforementioned manner.

A further feature is found in the adoption and use of attaching cleats for the ends of the carrying bail, the cleats being provided with eyes located within the perimeter or area of the cover so as to prevent hooking into the overalls or trousers of the milker while carrying the pail from place to place.

The feature considered to be most prominent, however, is the coordination with the sanitary top of an extensible and retractible milk delivery tube, this being provided with a teat cup and the cup and the tube, as a unit being slidable to bring the cup in close proximity to the teat to facilitate the direction of the milk stream definitely into the pail in a dependable and highly sanitary manner.

Other features and advantages will become more readily apparent from the following description and drawings.

In the drawings:—

Figure 1 is an elevational view of the complete milking pail characterized by the various features and accessories constituting the collective novelty heretofore mentioned.

Fig. 2 is a top plan view of Fig. 1 on a slightly enlarged scale with the slidable adapter sleeve or tube and cup removed.

Fig. 3 is a bottom plan view of Fig. 1, showing the base or bottom structure.

Fig. 4 is an enlarged central vertical sectional view disclosing the especially selected and mechanically coordinated features, said section being taken approximately on the plane of the line 4—4 of Fig. 2.

Fig. 5 is a top plan view of the extensible and retractible delivery tube showing the upper end construction thereof.

Fig. 6 is a side view of the detachable strainer equipped teat cup.

Fig. 7 is a top plan view of the cup shown in Fig. 6.

Figure 8 is an enlarged, vertical, diametrical section showing on an enlarged scale the relative arrangement of the element disclosed at the upper left hand corner of Figure 4.

Figure 9 is an enlarged detail horizontal section taken in the plane indicated by the line 9—9 of Figure 4, looking downwardly.

Ordinarily speaking, the milk bucket or pail is generally circular in cross sectional form. Moreover, the pail is quite frequently held between the knees of the milker. Obviously, this is tiresome and requires painstaking effort in prolonged milking operations. It is desirable, therefore, to provide a pail which may be placed directly on the ground or other supporting surface. Thus, in carrying the present invention into effect, I have perfected a pail 8 which is substantially oval in cross sectional form. This allows it to be conveniently placed between the calves of the legs of the user. The elevated or false bottom 9 is surrounded by a depending rim 10. In accordance with my ideas, one end of the rim is slit horizontally as indicated at 10 and the free slit part is hammered or otherwise driven back beneath the bottom so that it extends straight across as indicated at 12 in Figs. 3 and 4. This allows the forward end of the pail to be tipped down so that the weight is partly on the straight-across rest or foot 12 and partly upon the notched part 13. In other words this two point contact provides the desired rigid tipping or tilting result. Stated otherwise, the notched portion 13 cooperating with the element 12 cooperates in providing a firm seating or resting surface for the front end or corner portion of the pail. Thus, it does not wobble from side to side as would be the case with a circular rim, but rather anchors the pail in such a position, thus facilitating the milking operation.

The fixedly mounted cover is substantially pyramidal in top plan view. The main gradual sloping surfaces or areas are indicated by the numerals 14 and 15. The subordinate smaller somewhat triangular areas are indicated by the numerals 16. Suitable attaching plates or brackets 17 are secured to these inclined surfaces 16 and are provided with upstanding eyes 18 to which the eyes 19 on the carrying bail are hingedly connected for free handling. The bail 20 thus has its arm portions located within the perimeter of the cover and this avoids the presence of projections on the sides of the pail or bucket such as would get caught in the clothing of the attendant and interfere with free carrying of the pail from place to place. The numeral 21 designates a rigid hand grip appropriately located at a suitable central point on the sloping surface 15. By grasping this, it is possible to tilt the pail forward and downward against the points 12 and 13 to aid in holding it in a safe and reliable milking position. The surface or part 15 is formed into a spout 22 having a hinged lid 23 and a handle equipped latch 24 engaged with a keeper staple 24a to hold the lid normally closed and to guard against the entry of extraneous matter. This is a sanitary pouring feature as is obvious. As shown in Figure 4 the staple 24a is fixed to the spout 22, and extends upwardly through an opening in the lid 23.

Next, I call attention to an opening in the sloping surface 14. The opening is denoted by the numeral 25 and is adapted to accommodate the adjustable milk stream delivery means. In the first place, a rubber gasket is fitted around the marginal edge of the opening as indicated at 26. This serves to provide a friction-tight slip joint for the projectible and retractible milk delivery tube 27. This is of any appropriate length so that it can be lifted up or pushed down to the desired elevation. The idea is to provide a milk delivery tube which can be brought into close proximity to the teat of the cow so that the milk stream can be "shot" into the pail. In Fig. 5, it will be observed that the upper end of the slidable tube 27 is provided with an inturned bead 28 having diametrically opposite keeper notches 29 and outstanding finger grips 30. The grips 30 enable the sleeve to be readily moved up or down in relation to the cover of the pail. The notches 29 serve to permit passage therethrough of a retaining stud 31, Figure 9, carried by the strainer cup 32. The stud 31 is of appropriate shape and dimension and is adapted to be telescoped into the upper end of the tube. By matching the stud 31 with the desired notch 29, said stud can be passed through the notch and the cup can be given a part turn so as to lock the cup in place. The cup 32 is provided with an outstanding rim or lip 50, Figure 4, which rests on the bead 28. It is to be further observed that the rim portion 50 of said cup is provided with a suitable finger grip 34 located above the stud 31 to facilitate application and removal of said cup. The finger grip 34 is soldered or otherwise fixedly connected to the rim portion 50 of the cup 32, as indicated by 51 in Figure 8. Furthermore, the bottom of the cup is provided with a depending cylinder 35 closed at its bottom and having a foraminous strainer portion 36 in its wall, Figures 4 and 9. The cylinder 28 forms a straining nozzle and located telescopically therein is a slidable and turnable valve member 37. This is operated by a control rod 38 terminating at its upper end in a finger grip 39, the finger grip being located above the open top of the cup 32. The rod 38 is secured in fixed manner to the lower end of the member 37, Figure 9. As shown in Figures 4 and 9, the valve member 37 is in the form of a deep cup with an opening 37x in its side wall movable into and out of registration with the foraminous portion 36 in the wall of the cylinder 35. Manifestly when the valve member 37 is positioned as shown in Figure 4 and 9 milk can be strained through the foraminous portion 36 of cylinder 35 and permitted to pass to the tube 27, Figure 4, for delivery to the interior of the bucket 3. When, however, the valve member 37 is turned to move its opening 37x out of registration with the said foraminous portion, atmospheric air will be barred from the interior of the bucket.

Thus, we have a valved strainer cup which can be brought in close proximity to the teat to facilitate accurate delivery of the stream of milk into the tube 27 from which it is delivered into the pail. This cup and tube combine in forming an adapter or feeder unit allowing the bucket to be placed on the ground or held between the legs, and permitting the delivery of milk in a direct and sanitary manner into the pail. Naturally cows are of different statures and in some instances the udder is close to the ground and in other instances is comparatively high above the surface. Thus this extensible and retractible adapter means comprising the cup and tube makes it possible to get satisfactory results under all varying conditions. The parts 27 and 32 are bodily removable and separable from each other to facilitate sterilizing and cleaning.

The cover equipped pail is insect proof and dirt proof. Little or no extraneous matter is apt to get into the pail with a cover of this type during the milking operation. Added to this, we have the cooperating features 21, 12 and 13, facilitating tilting or tipping and the adapter feature just described in detail to facilitate delivering the milk from an elevated point directly into the pail.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention, what I claim is:—

1. A pail having a top with an opening therein, a gasket carried by said top and arranged in and about said opening, and a tube frictionally held in said gasket and movable upwardly and downwardly through the same whereby it may be made to extend various distances above the top.

2. A pail having a top, a tube carried in and extending above the top, a cup supported on and pendent in said tube and having a downwardly extending cylinder closed at its lower end and with a foraminous portion in its side wall, a removable and turnable cup-shaped valve member in said cylinder and having an opening in its side wall movable into and out of registration with the foraminous portion in the side wall of the cylinder, and a handle fixed to said valve member and extending upwardly to a point adjacent to the top of the cup.

3. A pail having a top with an opening therein, a gasket carried by said top and arranged in and about said opening, a tube frictionally held in said gasket and movable up and down through the same whereby it may be made to extend various distances above the top, a cup supported on and pendent in said tube and having a downwardly extended cylinder closed at its lower end and with a foraminous portion in its side wall, a removable and turnable cup-shaped valve member in said cylinder and having an opening in its side wall movable into and out of registration with the foraminous portion in the side wall of the cylinder, and a handle fixed to said valve member and extending upwardly to a point adjacent to the top of the cup.

JOSEPH F. GEORGE.